United States Patent [19]
Ebert et al.

[11] Patent Number: 5,931,874
[45] Date of Patent: Aug. 3, 1999

[54] UNIVERSAL ELECTRICAL INTERFACE BETWEEN AN AIRCRAFT AND AN ASSOCIATED STORE PROVIDING AN ON-SCREEN COMMANDS MENU

[75] Inventors: William J. Ebert, Catawissa; James V. Leonard, St. Charles; Gregory S. Van Dyke, O'Fallon, all of Mo.

[73] Assignee: McDonnell Corporation, St. Louis, Mo.

[21] Appl. No.: 08/868,436

[22] Filed: Jun. 4, 1997

[51] Int. Cl.$^6$ ....................................................... G06G 7/70
[52] U.S. Cl. ................................. 701/1; 701/3; 340/945; 324/537
[58] Field of Search ..................................... 701/1, 14, 15, 701/16, 200, 3; 348/564, 601, 734, 117, 460, 467; 345/158, 340, 8, 145, 113, 134; 395/883, 836; 324/537, 73.1, 158.1; 73/167; 244/3.16; 89/1.56, 1.815, 1.819, 1.59

[56] References Cited

U.S. PATENT DOCUMENTS

| | | | |
|---|---|---|---|
| 4,138,726 | 2/1979 | Girault et al. | 345/113 |
| 4,768,028 | 8/1988 | Blackie | 345/8 |
| 5,539,479 | 7/1996 | Bertram | 348/564 |
| 5,541,539 | 7/1996 | Mitzkus et al. | 244/3.16 |
| 5,548,510 | 8/1996 | Ebert et al. | 701/200 |
| 5,602,597 | 2/1997 | Bertram | 348/565 |
| 5,606,374 | 2/1997 | Bertram | 348/565 |
| 5,614,896 | 3/1997 | Monk et al. | 340/945 |

OTHER PUBLICATIONS

Drawing No. 1342AS114—Interface Design Specification Control–Monitor Set, Guided Weapon AN/AWW–13 to Aircraft Interface Using MIL–STD–1553 Data Bus, Nov. 1987.

*Primary Examiner*—Jacques H. Louis-Jacques
*Attorney, Agent, or Firm*—Senniger, Powers, Leavitt & Roedel

[57] ABSTRACT

Apparatus and method providing an electrical interface between an aircraft and an associated store for controlling data transmissions therebetween. The aircraft has a visual display of video signals received from the associated store. The electrical interface includes circuitry for generating a menu of the commands available to an operator of the aircraft and for generating a cursor associated with the menu. The electrical interface overlays the menu and cursor on the display to provide a user friendly electrical interface.

18 Claims, 4 Drawing Sheets

UNIVERSAL ELECTRICAL INTERFACE BETWEEN AN AIRCRAFT AND AN ASSOCIATED STORE PROVIDING AN ON-SCREEN COMMANDS MENU

TECHNICAL FIELD

The present invention relates generally to a signal conditioning method and apparatus and, particularly, to a method and apparatus for providing a user friendly universal electrical interface between an aircraft and an associated store.

BACKGROUND ART

Aircraft such as the F-4 and F-15 manufactured by McDonnell Douglas Corporation, the assignee of the present invention, are adapted to carry stores. Other aircraft, such as the F-16 and F-111 manufactured by Lockheed Aeronautical Systems Company and General Dynamics, respectively, are likewise adapted to carry stores. As an example, these stores include missiles such as the Walleye missile, the Standoff Land Attack missile (SLAM) and the Maverick missile. Typically, disconnectable pylons are used to mount missiles on the wing of a host aircraft so that the aircraft is able to carry the missiles to the vicinity of the target destination prior to their deployment.

Prior to, during and even after deployment of a store, the aircraft and its associated store communicate. For example, the aircraft and store bidirectionally transmit signals therebetween to appropriately configure and launch the store. In general, the pre-launch configuration includes downloading the target's coordinates and initializing the store's various sensors. In addition, certain stores, such as SLAM missiles, transmit video images of the target to the aircraft via radio frequency (RF) signals. The aircraft then monitors the flight path of a store after its deployment and, in some instances, controls its flight path to provide greater targeting accuracy.

A host aircraft typically includes an aircraft controls and displays module to provide bidirectional signal transmission between the aircraft and its associated store. The aircraft controls and displays module provides an interface by which the crew of the aircraft monitors and controls the aircraft's flight pattern. The aircraft controls and displays module also provides armament control, such as to control the deployment of stores. Typically, the aircraft controls and displays module includes both discrete controls (e.g., toggle switches) as well as a joystick, or control stick, for positioning and selecting a cursor displayed on a screen in the aircraft's cockpit.

A second type of store, namely a data link pod, further facilitates the bidirectional communication between the host aircraft and at least some associated missiles. The data link pod (e.g., an AN/AWW-13 or similar data link pod) provides a video interface between an associated missile and the aircraft controls and displays module. For example, the host aircraft typically employs a data link pod in conjunction with a SLAM missile to provide an RF data link between the SLAM missile and the host aircraft.

Both the aircraft and the associated store typically process signals according to a predetermined format. As used herein, format refers not only to the actual configuration of the data structure, but also to the content and order of transmission of the signals. The predetermined formats of the aircraft and the store are oftentimes different. In order to ensure proper signal reception by the host aircraft and the associated store, the signals must thus be provided to the aircraft or store in the predetermined format that the aircraft or store is adapted to process.

In addition, each different type of aircraft and each different type of store generally processes signals according to a different predetermined format. Typically, each store is adapted to be mounted on and deployed by only predetermined types of aircraft to ensure that signals are transmitted between the aircraft and the associated store according to the proper predetermined format. Thus, a missile and its associated data link pod, if any, are configured to process signals according to the predetermined format of the predetermined types of aircraft from which it is adapted to be deployed in order to ensure proper transmission of signals therebetween. By limiting each type of store to deployment from only certain predetermined types of aircraft, however, the flexibility with which stores can be deployed from aircraft is significantly restricted.

Likewise, aircraft are typically designed to interface with and deploy only one or more predetermined types of stores to ensure that signals are properly transmitted therebetween. Thus, the flexibility with which aircraft can deploy stores is further restricted by limiting each aircraft in the types of stores it is able to deploy.

Commonly assigned U.S. Pat. No. 5,548,510, the entire disclosure which is incorporated herein by reference, discloses a universal electrical interface between an aircraft and an associated store. The interface of U.S. Pat. No. 5,548,510 increases the flexibility with which stores can be deployed from aircraft such that a plurality of types of stores can be launched from a plurality of types of aircraft. In addition, the interface of this patent increases the flexibility with which a store can be deployed from a plurality of types of aircraft without increasing the demand on the aircraft's central control processor, adding additional electronics to the aircraft controls and displays module or modifying the command sequence and associated displays employed by crew to deploy an associated store. Although U.S. Pat. No. 5,548,510 provides improvements in such interfaces, further improvements are still desired.

For example, an aircraft's pilot often provides commands to the associated store. In conventional aircraft, these commands are effected by actuating toggle switches mounted in an aircraft flight crew station or by actuating switches positioned on the control stick. In general, the switches that are used to conventionally effect the commands are not identified to the crew. Rather, the crew must memorize the particular functions of each switch. Further, the pilot must often remove his or her hand from the control stick and look away from the cockpit multifunction display in order to actuate the switches.

For these reasons, an improved user friendly interface is desired which allows the pilot to keep his or her hand on the aircraft's control stick and eyes on the multifunction display while selecting commands, reduces the number of operations required by the pilot, reduces the number of functions that the pilot must memorize and allows faster response time.

DISCLOSURE OF THE INVENTION

The invention meets the above needs and overcomes the deficiencies of the prior art by providing an improved electrical interface between an aircraft and an associated store. This is accomplished by a user friendly interface employing an on-screen commands menu from which the aircraft's pilot easily selects commands for controlling the associated store. By providing such an interface, the invention reduces distractions to the aircraft's pilot when he or she is making commands to the associated store. Likewise, the user friendly interface of the invention reduces the number of functions that the pilot must memorize to command the associated store. In turn, the invention permits faster response time by the pilot in commanding the associated store.

Briefly described, an apparatus embodying aspects of the present invention is for providing an electrical interface between an aircraft and an associated store for controlling data transmissions therebetween. The aircraft has a video display device providing a visual display to an operator of the aircraft. The aircraft also has an input device including at least one switch adapted to be actuated by the operator. The apparatus includes a video mixer coupled to the associated store. The video mixer receives video signals from the associated store and transmits them to the video display device to generate the display. The apparatus also includes a processor which defines a plurality of commands for controlling the associated store and a video graphics generator for generating a menu of the commands available to the operator. The video graphics generator also generates a cursor associated with the menu and is coupled to the video mixer for overlaying the menu and the cursor on the display. The video graphics generator moves the cursor on the display in response to position signals provided by the input device. When the cursor is touching a portion of the menu corresponding to a desired command, the operator selects the desired command by actuating the input device switch.

In another embodiment, a method of the invention provides an electrical interface between an aircraft and an associated store for controlling data transmissions therebetween. The aircraft has a video display device providing a visual display to an operator of the aircraft. The aircraft also has an input device including at least one switch adapted to be actuated by the operator. The method includes the steps of receiving video signals from the associated store and transmitting the received video signals to the video display device. The visual display is then generated in response to the received video signals. The method also includes defining a plurality of commands for controlling the associated store, generating a menu of the commands available to the operator and generating a cursor associated with the menu. The method further includes the steps of overlaying the menu and the cursor on the display, moving the cursor on the display in response to position signals provided by the input device and selecting a desired command from the menu by the operator actuating the input device switch when the cursor is touching a portion of the menu corresponding to the desired command.

Other objects and features will be in part apparent and in part pointed out hereinafter.

BRIEF DESCRIPTION OF DRAWINGS

Corresponding reference characters indicate corresponding parts throughout the drawings.

BEST MODES FOR CARRYING OUT THE INVENTION

Figure 1:
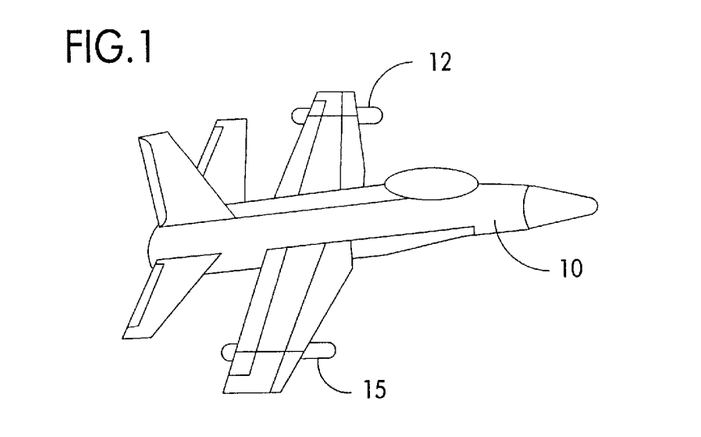
FIG. 1 is a perspective view of an aircraft and an associated store.

Referring now to FIG. 1, an aircraft 10 and two types of associated stores are illustrated. The aircraft is, for example, an F-15 Eagle aircraft manufactured by McDonnell Douglas Corporation, the assignee of the present invention, or an F-16 Falcon aircraft manufactured by Lockheed Aeronautical Systems Company. It is contemplated, however, that aircraft 10 may be any number of other aircraft adapted to communicate with and deploy stores without departing from the present invention. Likewise, one type of associated store is a missile 12, such as a Walleye missile, a Standoff Land Attack Missile (SLAM) or a Maverick missile. However, the missile 12 may be any of a variety of other missiles which are adapted to be aerially deployed from an aircraft.

FIG. 1 also illustrates a second type of associated store, namely, a data link pod 16 which provides a radio frequency (RF) command and video interface between the host aircraft 10 and missile 12 following deployment. In a preferred embodiment, the data link pod 16 is an AN/AWW-13 guided weapon interfaces developed by the Naval Avionics Center. The AN/AWW-13 guided weapon interface is described in greater detail in Publication No. 1342AS114 dated Nov. 15, 1988 by the Naval Avionics Center. It is to be understood that data link pod 16 may be any of a variety of other types of data link pods without departing from the present invention. In addition, the signal conditioning method and apparatus of the present invention may be employed in conjunction with missiles, such as Maverick missiles, which do not communicate with the host aircraft via a data link pod following deployment as described hereinafter.

Figure 2A:
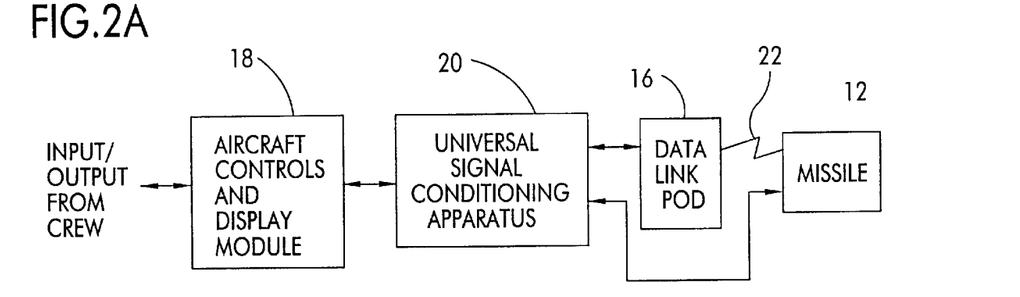
FIG. 2A is a block diagram illustrating one embodiment of an electrical interface of the present invention and the associated aircraft controls and displays module, data link pod and missile.
Figure 2B:
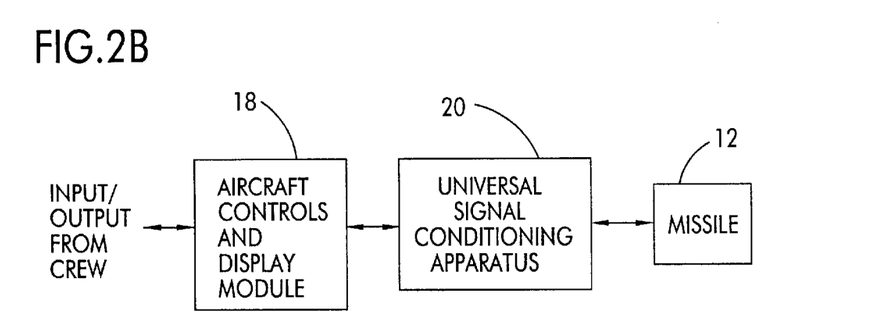
FIG. 2B is a block diagram illustrating another embodiment of an electrical interface of the present invention and the associated aircraft controls and displays module and missile.

FIGS. 2A and 2B illustrate various electrical components of aircraft 10 in block diagram form. As shown, aircraft 10 includes an aircraft controls and displays module 18 which provides the unique electrical circuitry for controlling the flight of aircraft 10 and the deployment of its armament systems, including the deployment of the associated missile 12. The controls and displays module 18 also provides a display device (e.g., a video monitor) by which the crew further monitors the flight of aircraft 10 and the deployment of its associated missile(s) 12. Further, aircraft controls and displays module 18 receives input from the crew to control the flight of aircraft 10 and the deployment of missile(s) 12.

To perform these and other functions, aircraft controls and displays module 18 processes a variety of signals according to a predetermined format. Different types of aircraft generally process signals according to different predetermined formats and have different sets of controls and displays. According to the present invention, aircraft 10 includes an electrical interface 20, also referred to as a universal signal conditioning apparatus or pod adapter unit, that provides a universal electrical connection between aircraft controls and displays module 18 and an associated store (i.e., missile 12 or data link pod 16). Advantageously, the electrical interface 20 enables aircraft 10 to deploy a plurality of different types of missiles 12, at least some of which process signals according to a different predetermined format than aircraft controls and displays module 18.

Commonly assigned U.S. Pat. No. 5,548,510, the entire disclosure which is incorporated herein by reference, discloses a preferred universal signal conditioning apparatus improved upon by the present invention.

As illustrated in FIG. 2A, one embodiment of electrical interface 20 is preferably disposed between aircraft controls and displays module 18 and data link pod 16. Electrical interface 20 bidirectionally communicates with data link pod 16 which, in turn, is adapted to communicate via RF signals 22 with associated missile 12 (e.g., a SLAM missile). While the data link of RF signals 22 may be established between data link pod 16 and missile 12 prior to deployment, it is typically established during or following deployment when missile 12 transmits a video image of, for example, the target, to data link pod 16 and, in turn, to aircraft controls and displays module 18. As known to those skilled in the art, only some types of missiles 12, such as SLAM missiles, are adapted to communicate via a data link of RF signals 22 with data link pod 16 to provide video images following deployment according to this embodiment of the present invention. In some instances, electrical interface 20 directly provides missile 12 with power, typically three-phase power, and a release signal which triggers its deployment.

Another embodiment of the present invention is illustrated in FIG. 2B in which electrical interface 20 communicates bidirectionally with the associated missile 12 (e.g., a Maverick missile). According to this embodiment, missile 12 communicates directly with electrical interface 20 without the assistance of data link pod 16.

In either embodiment, electrical interface 20 preferably mates with the existing hardware and software of aircraft 10, missile 12 and data link pod 16, if any. As such, the hardware and software of aircraft 10 need not be substantially modified.

Figure 3:
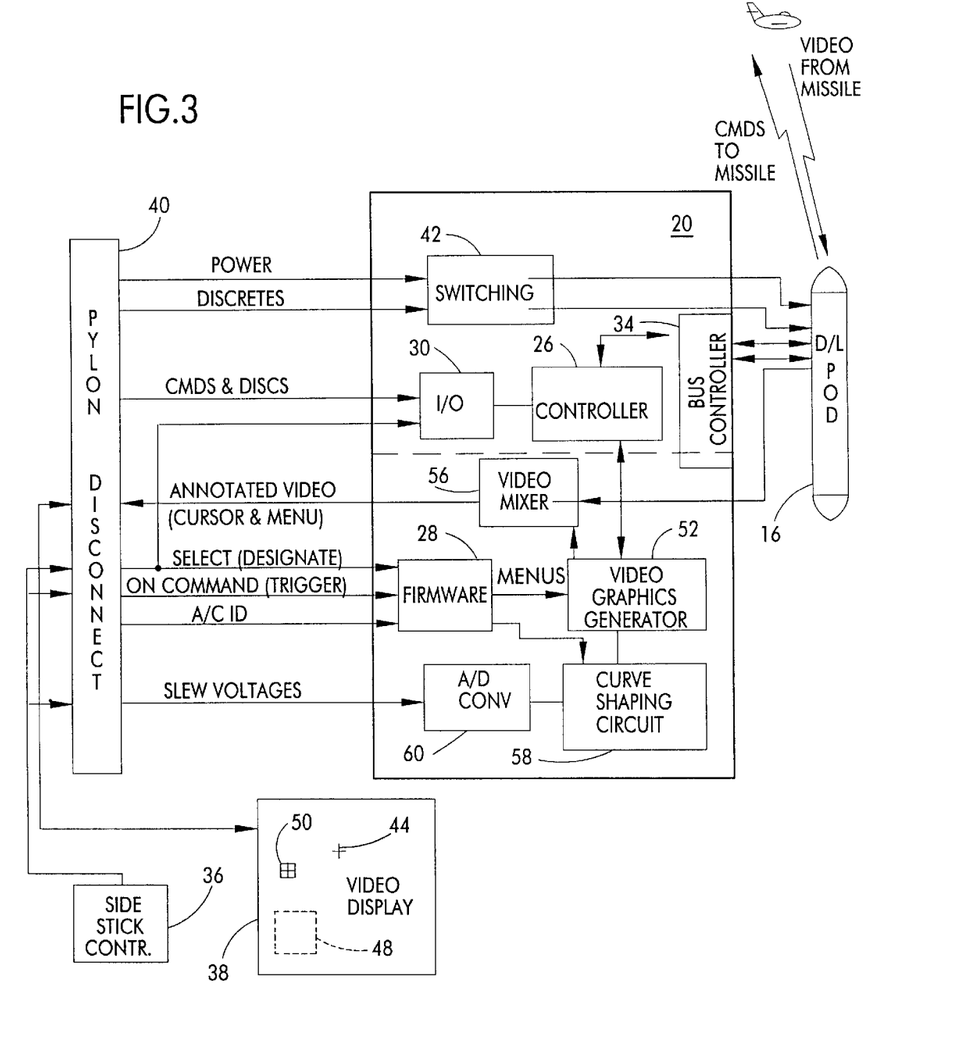
FIG. 3 is a detailed block diagram of an electrical interface according to the present invention.

Referring now to FIG. 3, electrical interface 20 preferably includes a controller 26, such as a microcontroller or microprocessor and an associated memory device, for providing an electrical interface between aircraft 10 and either data link pod 16 or missile 12.

As is known in the art, different types of aircraft are typically adapted to process signals formatted according to different predetermined formats. Preferably, aircraft controls and displays module 18 provides a signal to electrical interface 20 that identifies the type of host aircraft 10. Electrical interface 20 includes firmware 28 receiving and responsive to the aircraft identification signal for determining the type of aircraft 10. In particular, firmware 28 comprises a memory (e.g., an EPROM) storing executable routines and data. For example, the memory of firmware 28 stores an inventory of aircraft types cross-referenced with their corresponding identification signals.

In addition to identifying the type of aircraft 10, electrical interface 20 preferably identifies the type of store associated with it. As explained above, electrical interface 20 of the present invention allows different types of stores, each adapted to process signals according to a different predetermined format, to communicate with an aircraft that may be adapted to process signals according to yet another predetermined format. For example, the associated stores include Walleye, SLAM and Maverick missiles, AN/AWW-13 data link pods, and the like. Although FIG. 2B shows missile 12 in direct communication with electrical interface 20, for clarity, the remaining description of the invention will refer to the embodiment of FIG. 2A which includes data link pod 16.

Referring further to FIG. 3, an aircraft interface embodied by an input/output (I/O) interface 30 provides bidirectional communication between the controller 26 and aircraft 10 according to a first predetermined format that corresponds to the identified aircraft type. As shown in FIG. 3, electrical interface 20 has a bus controller 34 (e.g., a MIL-STD-1553B bus controller) for controlling signal transmission between data link pod 16 and controller 26. In a preferred embodiment of the invention, controller 26 in combination with the I/O interface 30 is embodied by the controller disclosed in commonly assigned U.S. Pat. No. 5,548,510. As such, a store interface (not shown) of controller 26 cooperates with the bus controller 34 for transmitting signals to and from the associated store (i.e., data link pod 16). The store interface provides bidirectional communication between controller 26 and data link pod 16 according to a second predetermined format. Since the second format is typically different than the first format, aircraft 10 and data link pod 16 are generally unable to effectively communicate without electrical interface 20 of the present invention.

The controller 26 of electrical interface 20 also provides signal conditioning in response to the type of aircraft identified. Controller 26 selectively processes signals received by I/O interface 30 according to the type of aircraft identified by firmware 28. As such, different types of aircraft 10 are able to bidirectionally communicate with the associated store (i.e., data link pod 16) according to the predetermined formats which they are adapted to process. In general, controller 26 translates the signals received via I/O interface 30 according to the first format to the second format which the associated store is adapted to process. Controller 26 then transmits the translated signals to data link pod 16. Similarly, controller 26 receives signals from data link pod 16, translates them from the second format to the first format, and then transmits them to aircraft 10 via I/O interface 30.

According to the invention, electrical interface 20 of the present invention is adapted to selectively process a variety of signals, including discrete signals, analog signals and digital signals.

In one embodiment, controller 26 processes discrete signals received by I/O interface 30 and translates them to corresponding discrete or digital signals which the associated store (i.e., data link pod 16) is adapted to process. For example, an associated store may require each of the discrete signals provided by aircraft 10 to be individually transmitted thereto in a predetermined order. Alternatively, the associated store may be adapted to process only predetermined ones of the discrete signals provided by aircraft 10 or may be adapted to process a combination of several of the discrete signals provided by aircraft 10. Still further, the associated store may be adapted to digitally receive several of the discrete signals provided by I/O interface 30. Likewise, the associated store also transmits discrete signals to aircraft 10. These discrete signals may also require translation by controller 26, as described above, based upon the particular type and format of discrete signals which data link pod 16 is adapted to transmit and the type and format of discrete signals which aircraft 10 is adapted to receive.

As an example, aircraft 10 transmits discrete signals to the associated store for selecting the signaling frequency of the host aircraft 10, the power level and polarity of the associated store's transmitter and the position of the store's antenna. A discrete signal may also be used to activate a videocassette tape recorder (not shown) in data link pod 16 for receiving and recording video images following deployment of missile 12. In addition, discrete signals may initiate and terminate a built-in-test to verify that electrical interface 20, missile 12 and data link pod 16, if any, are operable. Discrete signals may also be used to select and simulate one of a plurality of preprogrammed flight plans and to select the field of view of the associated missile. These discrete signals are conventionally effected by actuating toggle switches mounted in an aircraft flight crew station or by actuating switches positioned on an associated control stick 36 (e.g., a Control Grip Model No. 349676 available from Measurement Systems, Inc.) or other known input device (e.g., a keypad, mouse or trackball). In general, the switches used to conventionally effect the discrete signals are not identified to the crew of aircraft 10. Rather, the crew must memorize the particular functions of each switch.

As described below, the present invention advantageously provides for the discrete signals to be effected by the control stick 36 in combination with an on-screen menu (see FIG. 4) on a video display 38 generated by electrical interface 20. In a preferred embodiment, the video display 38 and control stick 36 are part of the aircraft controls and displays module 18 and are connected to electrical interface 20 via a pylon disconnect 40.

For those discrete signals which may be communicated directly to data link pod 16 without translation, electrical interface 20 includes a switching network 42. In addition to communicating discrete control settings, the switching network 42 also couples electrical power from aircraft 10 to data link pod 16.

Electrical interface 20 also receives a plurality of analog signals from aircraft 10 via I/O interface 30. The different stores, however, are typically only adapted to receive, in addition to the discrete signals described above, digital signals. Accordingly, controller 26 converts the analog signals received from I/O interface 30 to corresponding digital signals prior to transmitting them to data link pod 16. Likewise, data link pod 16 generally transmits digital signals to aircraft 10. The different aircraft, however, are typically only adapted to receive, in addition to the discrete signals described above, analog signals. Accordingly, controller 26 also converts the digital signals received from data link pod 16 to corresponding analog signals prior to transmitting them to aircraft 10 via I/O interface 30.

Figure 4:
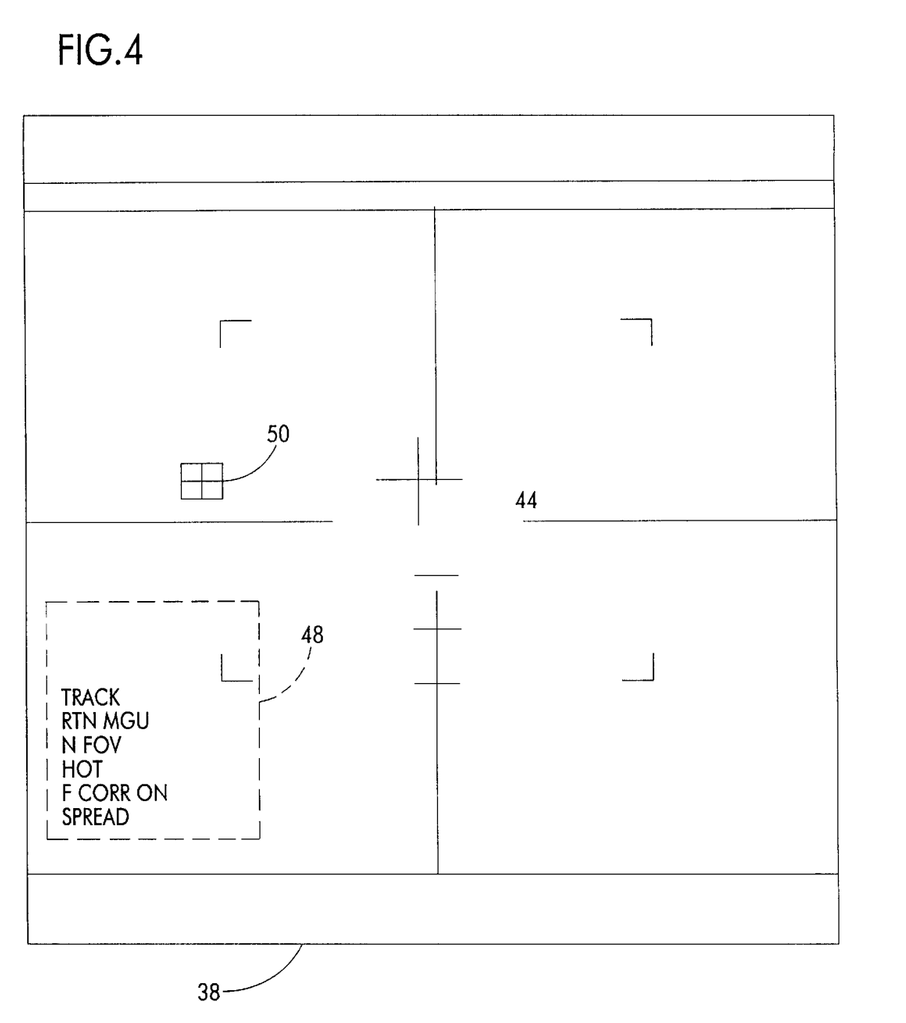
FIG. 4 is an exemplary screen display generated by the electrical interface of FIG. 3.

The analog/digital signals transmitted between aircraft 10 and data link pod 16 include, for example, signals representing the x and y coordinates of a cursor 44 on video display 38. In this instance, the cursor 44 is associated with missile 12 and, after missile 12 is deployed, the analog and digital signals transmitted between aircraft 10 and missile 12 through data link pod 16 also include, for example, a command track signal to guide missile 12 based upon the position of missile cursor 44 on display 38. As known to those skilled in the art, missile 12 is responsive to the position of missile cursor 44 for controlling its flight path in some instances. The signals transmitted following deployment of missile 12 also include signals which select alternate fields of view and alternate polarities, return control to the mid-course guidance unit (MGU) to allow autonomous targeting, and cause a forced correlation to allow operator control of missile impact point.

FIG. 4 illustrates an exemplary screen display within video display 38. Electrical interface 20 generates the screen display according to the invention to include the cursor 44 associated with missile 12 (e.g., a SLAM cursor), an on-screen command menu 48 and another cursor 50 associated with the on-screen menu 48. When the pilot, or other operator onboard aircraft 10, activates the first detent on the trigger switch, for example, of control stick 36, the command menu 48 and the cursor 50 generated by electrical interface 20 appear on the multifunction video display 38. In this embodiment of the invention, the slew voltages generated when the pilot moves control stick 36 controls the position of cursor 50. Specific sections of the pilot's presentation are displayed as menus such as command menu 48 from which the pilot selects the pre-launch and post-launch commands to missile 12 via data link pod 16. The pilot moves cursor 50 over the desired option on menu 48 and activates the designate switch. For example, the trigger switch of control stick 36 provides a designating command for cursor 50. This selects the chosen command to be sent to data link pod 16 which will forward it to missile 12 via RF signals 22.

As an example, on-screen menu 48 displays the following commands: TRACK; RTN MGU; N FOV or W FOV; HOT or COLD; F CORR ON or F CORR OFF; and SPREAD. In general, TRACK commands missile 12 to track, or lock on, the target designated by the missile cursor 44 whereas RTN MGU commands the control of missile 12 to return to the mid-course guidance unit of aircraft 10. The RTN MGU command is used to return missile 12 to its original course and direct it back to the predetermined target when the pilot loses the target from video display 38 due to, for example, "overslewing" missile cursor 44. The SPREAD command causes electrical interface 20 to transmit in a spread spectrum mode which makes the transmission less detectable.

In the illustrated embodiment, on-screen commands menu 48 also provides three toggled commands. First, the FOV command provides a wide (W) or a narrow (N) field of view for the missile seeker display. For example, the pilot usually selects a narrow field of view when missile 12 is close to its target to allow placing missile cursor 44 on a particular spot on the target. Second, the missile seeker is preferably an infrared unit and tracks targets that are either HOT or COLD. Third, the F CORR command turns ON or turns OFF forced correlation which allows operator control of missile impact point.

Referring again to FIG. 3, electrical interface 20 also includes a video graphics generator 52 which, in combination with firmware 28, responds to commands from aircraft 10 and generates the on-screen menu 48 and cursor 50 (see FIG. 4) within display 38. In a preferred embodiment of the present invention, electrical interface 20 includes a video mixer 56 for receiving video signals from missile 12 via data link pod 16 and transmitting them to aircraft 10. In particular, the associated missile 12 typically transmits RF video signals 22 to the host aircraft 10 via data link pod 16 following its deployment. The crew of aircraft 10 monitors the video signals and, in some instances, controls the flight path of the deployed missile 12, typically via RF signals 22 transmitted to missile 12, to provide greater targeting accuracy. In this instance, the video mixer 56 adds menu 48 and cursor 50 generated by the video graphics generator 52 to the video signal coming from missile 12 via data link pod 16. This results in a composite video signal for display by aircraft controls and displays module 18 in which menu 48 and cursor 50 overlay video display 38.

As an example, video graphics generator 52 and video mixer 56 are embodied by a modified Accelerated Graphics Computer Card #VP-W4M-PCI manufactured by MicroConversions, Inc. In the alternative, it is contemplated that the processor of controller 26 may be programmed to implement the functions of video mixer 56 and video graphics generator 52.

Electrical interface 20 also includes a curve shaping network 58 for normalizing the slew voltages from aircraft controls and displays module 18 and, particularly, from control stick 36. Since different aircraft types have different voltage ranges for slew voltages, the curve shaping network 58 ensures that cursor 50 moves at the same rate of speed and distance for each of the different types of available aircraft. Preferably, an analog-to-digital (A/D) converter 60 converts the slew voltages generated by control stick 36 from analog to digital format before curve shaping network 58 normalizes them. It is contemplated that control stick 36 may provide digital signals representative of slew voltages instead of analog slew voltages. In this instance, the A/D converter 60 may be omitted.

Figure 5:
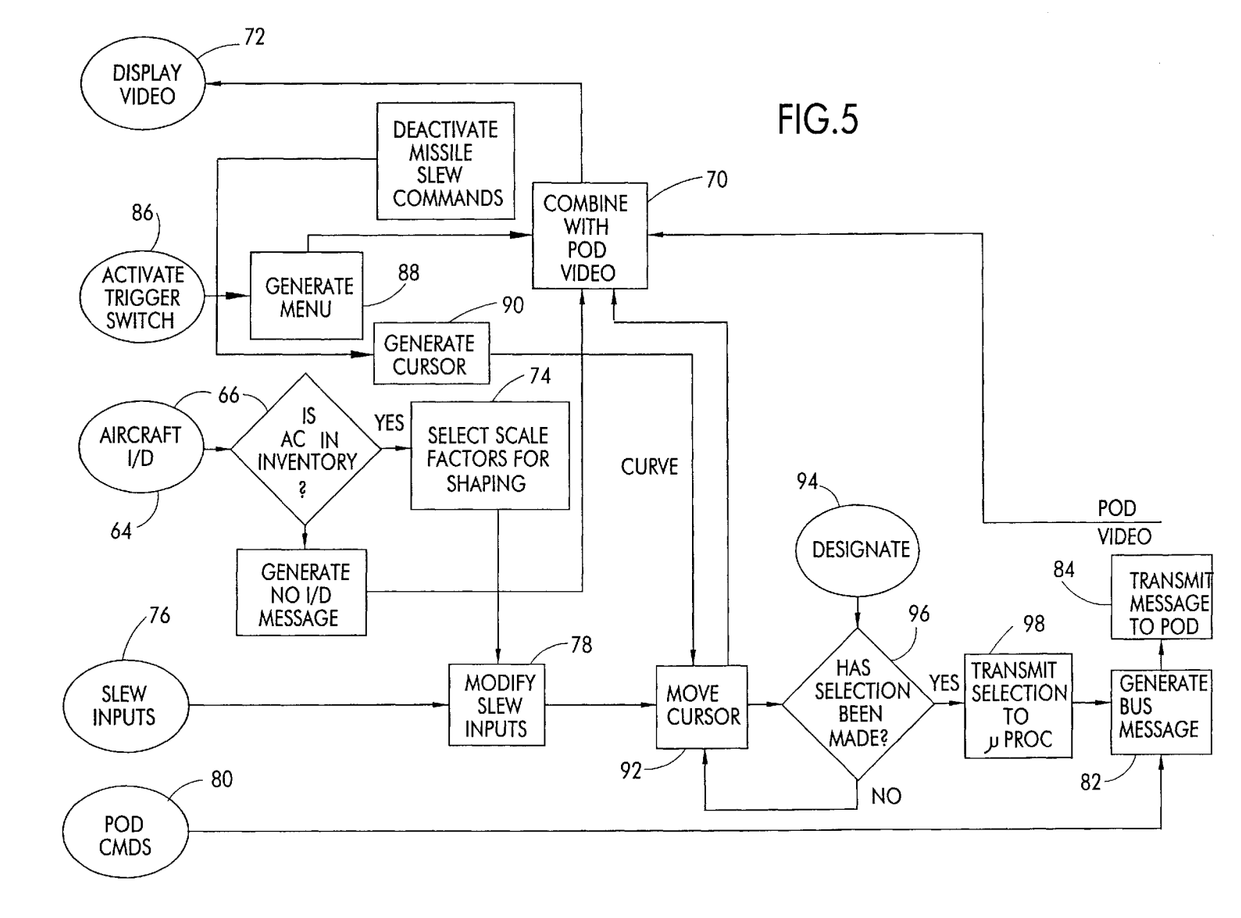
FIG. 5 is an exemplary flow diagram illustrating operation of the electrical interface of FIG. 3.

FIG. 5 illustrates the operation of firmware 28 in flow diagram form. According to the invention, the memory (e.g., EPROM) of firmware 28 stores executable routines for performing the flow diagram of FIG. 5. Beginning at input step 64, aircraft controls and displays module 18 provides a signal that identifies the type of host aircraft 10 to electrical interface 20. In response to the identification signal, electrical interface 20 proceeds to decision step 66 to search the aircraft inventory stored in the memory of firmware 28 to retrieve the type of aircraft that corresponds to the identification signal. If electrical interface 20 does not find an aircraft type in the inventory that corresponds to the identification signal, it generates a message to that effect at step 68. This message is then combined at step 70 with the video signal from data link pod 16 and then displayed on video display 38 at output step 72.

On the other hand, if electrical interface 20 retrieves the type of aircraft corresponding to the identification signal at step 66, it proceeds to step 74 for selecting scale factors for use by curve shaping network 58. As electrical interface 20 receives slew inputs (e.g., slew left, slew right, slew up, slew down) at input step 76 from aircraft controls and displays module 18 and, particularly, from control stick 36, curve shaping network 58 modifies the slew voltages at step 78 as a function of the scale factors determined at step 80. For example, one type of aircraft input device produces slew voltages in one range while another type of aircraft input device produces slew voltages in another range. By multiplying the analog slew voltages be the scale factors retrieved from memory that correspond to the particular aircraft type, controller 26 normalizes the slew inputs before moving cursor 50.

Referring now to input step 80, electrical interface 20 receives commands for data link pod 16 from aircraft controls and displays module 18. The bus controller 34 of electrical interface 20 generates a message at step 82 as a function of these commands and then transmits the message at step 84 to data link pod 16.

According to a preferred embodiment of the invention, the pilot activates, for example, the first detent on the trigger switch of control stick 36 at input step 86 to generate on-screen commands menu 48. In response to the input, electrical interface 20 generates the menu 48 at step 88. Video mixer 56 combines the commands menu 48 with the video signal from data link pod 16 at step 70 and then displays menu 48 within the display 38 at step 72. In addition to on-screen menu 48, electrical interface 20 generates cursor 50 at step 90 in response to the pilot activating the trigger switch.

In addition to the above-described steps, electrical interface 20 is responsive to the pilot activating the trigger switch at step 86 for deactivating the slew commands to the store at step 91. This prevents the pilot's movement of control stick 36 from moving missile cursor 44 on display 38.

At step 92, electrical interface 20 moves cursor 50 in response to the slew inputs at step 76 provided by the pilot via aircraft controls and displays module 18. Video mixer 56 also combines cursor 50 with the video signal from data link pod 16 at step 70 and then displays cursor 50 in combination with menu 48 within display 38 at step 72. According to the invention, the pilot moves cursor 50 in this manner to select commands from onscreen commands menu 48. The pilot moves cursor 50 to the desired option on menu 48 and activates the designate switch at input step 94 to select the command. For example, the trigger switch of control stick 36 provides a designating command for cursor 50. If electrical interface 20 determines at decision step 96 that the pilot properly made his or her selection, it transmits the selection to the microprocessor of controller 26 at step 98. As before, bus controller 34 generates a message at step 82 as a function of the selected command and then transmits the message at step 84 to data link pod 16.

On the other hand, if electrical interface 20 determines at step 96 that the pilot did not make his or her selection properly (e.g., cursor 50 was not on one of the selections), then it returns to step 92.

In this manner, the present invention advantageously provides a cockpit presentation which is user friendly for the crew of aircraft 10. For example, a single discrete command may be used in conjunction with menu 48 presentations on the pilot's multifunction display 38 instead of the several discrete commands conventionally implemented. The pilot is not required to remove his or her hand from control stick 36 or eyes from display 38 to command the functions. Thus, the present invention reduces the number of operations required by the pilot, reduces the number of functions that the pilot must memorize and allows faster response time.

Further, firmware 28 combines pilot actions with those of electrical interface 20 to provide unique missile results without affecting the previously installed aircraft hardware or software. Also, by scaling the slew voltages, the present invention provides a uniform cursor response in different types of aircraft In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. An apparatus providing an electrical interface between an aircraft and an associated store for controlling data transmissions therebetween, said aircraft having a video display device providing a visual display to an operator of the aircraft and having an input device including at least one switch adapted to be actuated by the operator, said apparatus comprising:

a video mixer coupled to the associated store for receiving video signals therefrom and transmitting the received video signals to the video display device for generating the display;

a controller defining a plurality of commands for controlling the associated store; and a video graphics generator for generating a menu of the commands available to the operator and for generating a first cursor associated with the store and a second cursor associated with the menu, said video graphics generator being coupled to the video mixer for overlaying the menu and the cursors on the display, said video graphics generator being responsive to position signals provided by the input device for moving the first and second cursors on the display independently of each other, said operator selecting a desired command from the menu by actuating the input device switch when the second cursor associated with the menu designates the desired command wherein said controller is responsive to the input device switch to execute the designated command.

2. The apparatus of claim 1 wherein the input device is a control stick responsive to movement by the operator for generating the position signals, said position signals being representative of the position of the control stick relative to an origin position, and wherein the input device switch is a hand-actuated switch on the control stick providing a designate command when actuated, said controller being responsive to the designate command for causing the desired option to be selected.

3. The apparatus of claim 1 wherein the video graphics generator is responsive to the operator actuating the input device switch for generating the menu.

4. The apparatus of claim 1 further comprising a memory storing information representative of a plurality of types of aircraft and representative of a range of position signals corresponding to each of the types of aircraft, said aircraft providing an identification signal corresponding to one of the types of aircraft, and wherein the controller is responsive to the identification signal provided by the aircraft for determining the type of the aircraft from the stored information and for retrieving the position signal information that corresponds to the determined type of the aircraft.

5. The apparatus of claim 4 further comprising a circuit for modifying the position signals from the input device as a function of the retrieved position signal information to provide substantially uniform cursor movement on the display in response to position signals from different types of aircraft.

6. The apparatus of claim 5 wherein the position signals comprise a plurality of analog voltages representative of movement of the input device by the operator relative to an origin position and wherein the circuit for modifying the position signals from the input device normalizes the analog voltages so that cursor movement on the display resulting from movement of the input device in one type of aircraft approximates cursor movement on the display resulting from movement of the input device in another type of aircraft.

7. The apparatus of claim 6 wherein the position signal information stored in the memory comprises a set of scaling factors corresponding to each of the types of aircraft whereby the circuit for modifying the position signals from the input device modifies the analog voltages as a function of the scaling factors corresponding to the determined type of the aircraft.

8. The apparatus of claim 1 wherein the associated store is a data link pod including a video recorder for receiving video signals from a missile deployed by the aircraft, said data link pod transmitting the video signals received from the missile to the video mixer.

9. The apparatus of claim 1 further comprising a memory storing executable routines implementing the electrical interface and wherein the controller executes the stored routines to selectively process signals received from the aircraft and from the associated store.

10. A method of providing an electrical interface between an aircraft and an associated store for controlling data transmissions therebetween, said aircraft having a video display device providing a visual display to an operator of the aircraft and having an input device including at least one switch adapted to be actuated by the operator, said method comprising the steps of:

receiving video signals from the associated store and transmitting the received video signals to the video display device;

generating the visual display in response to the received video signals;

generating a first cursor associated with the store;

defining a plurality of commands for controlling the associated store;

generating a menu of the commands available to the operator;

generating a second cursor associated with the menu;

overlaying the menu and the cursor on the display;

moving the first and second cursors on the display independently of each other in response to position signals provided by the input device;

selecting a desired command from the menu by the operator actuating the input device switch when the second cursor associated with the menu designates the desired command; and executing the designated command in response to the input device switch.

11. The method of claim 10 wherein the input device is a control stick responsive to movement by the operator for generating the position signals and the input device switch is a hand-actuated switch on the control stick, said position signals being representative of the position of the control stick relative to an origin position, and further comprising the steps of providing a designate command when the operator actuates the hand-actuated switch causing the desired option to be selected in response to the designate command.

12. The method of claim 10 wherein the step of generating the menu comprises generating the menu in response to the operator actuating the input device switch.

13. The method of claim 10 further comprising the steps of storing information in a memory representative of a plurality of types of aircraft and representative of a range of position signals corresponding to each of the types of aircraft, receiving an identification signal from the aircraft corresponding to one of the types of aircraft provide, determining the type of the aircraft from the stored information in response to the identification signal provided by the aircraft, and retrieving the position signal information that corresponds to the determined type of the aircraft.

14. The method of claim 13 further comprising the step of modifying the position signals from the input device as a function of the retrieved position signal information to provide substantially uniform cursor movement on the display in response to position signals from different types of aircraft.

15. The method of claim 14 wherein the position signals comprise a plurality of analog voltages representative of movement of the input device by the operator relative to an origin position and wherein the step of modifying the position signals from the input device includes normalizing the analog voltages so that cursor movement on the display resulting from movement of the input device in one type of aircraft approximates cursor movement on the display resulting from movement of the input device in another type of aircraft.

16. The method of claim 15 wherein the position signal information stored in the memory comprises a set of scaling factors corresponding to each of the types of aircraft and wherein the step of modifying the position signals from the input device comprises modifying the analog voltages as a function of the scaling factors corresponding to the determined type of the aircraft.

17. The method of claim 10 further comprising the steps of storing executable routines implementing the electrical interface and executing the stored routines to selectively process signals received from the aircraft and from the associated store.

18. An aircraft having a user-friendly electrical interface with an associated store for controlling data transmissions between the aircraft and the associated store, said aircraft comprising:

a video display device providing a visual display to an operator of the aircraft;

an input device including at least one switch adapted to be actuated by the operator;

a video mixer coupled to the associated store for receiving video signals therefrom and transmitting the received video signals to the video display device for generating the display;

a controller defining a plurality of commands for controlling the associated store; and a video graphics generator for generating a menu of the commands available to the operator and for generating a first cursor associated with the store and a second cursor associated with the menu, said video graphics generator being coupled to the video mixer for overlaying the menu and the cursors on the display, said video graphics generator being responsive to position signals provided by the input device for moving the first and second cursors on the display independently of each other, said operator selecting a desired command from the menu by actuating the input device switch when the second cursor associated with the menu designates the desired command wherein said controller is responsive to the input device switch to execute the designated command.

\* \* \* \* \*